Dec. 17, 1968  K. M. WELCH  3,416,768

LOW LEAKAGE CONFINED SEAL

Filed Nov. 28, 1966

INVENTOR.
KIMO M. WELCH
BY
*Toland A. Goodwin*
ATTORNEY.

United States Patent Office 3,416,768
Patented Dec. 17, 1968

3,416,768
LOW LEAKAGE CONFINED SEAL
Kimo M. Welch, Stockton, Calif., assignor to the United States of America as represented by the United States Atomic Energy Commission
Filed Nov. 28, 1966, Ser. No. 597,494
6 Claims. (Cl. 251—157)

The invention disclosed herein was made in, or under, Contract No. AT(04-3)-400 with the United States Atomic Energy Commission.

The invention relates generally to metal seals for large diameter valve seats, conduit joints, and the like, to maintain high differential pressures, and more particularly pertains to a vacuum seal which, even after repeated closures, requires only a relatively light sealing force to maintain a very low leakage rate.

In known sealing arrangements, for example large diameter vacuum gate valve seats, various problems have been encountered. Metal seats having minimum acceptable creep characteristics are of hard metal, such as copper-stainless steel, and generally require high sealing forces on the order of 500–1500 pounds per lineal inch of seal to successfully maintain a vacuum seal. These seats require closing mechanisms to bring the parts of the valve accurately together upon initial closure of the valve, and to repeat this accuracy during successive closures. Other metal seats which have lower sealing forces (100–500 pounds per lineal inch of seal) exhibit creep with usage which must be compensated for in the design of the valve mechanism. Following repeated closures and creepage, some of these seats work-harden and thereafter require a higher sealing force. In all of these known seats, it is found difficult to predict a leakage rate for a predetermined sealing force applied during successive closures.

More particularly, prior art ring-shaped vacuum seals have been designed which restrain a highly ductile sealing material in a groove of rectangular cross section. This material is usually lead or indium. A precision machined, flat bottom knife edge fits closely into the groove. The sealing material is confined thereby to the groove so that there is a plastic cold flow or coining of the sealing material. Machine tolerances between the knife edge and the groove, although difficult, may be achieved for small diameter seals in order to minimize creep and consequent extrusion of material from the groove. For larger diameter seals, however, the close tolerances required to prevent extrusion become impractical to achieve in view of the precision machining required of the groove and cooperating knife edge. Furthermore, with both large and small diameter seals, precision parts are required in a closing mechanism therefor in order to obtain accurate closure of the close fitting seal.

Briefly, the present invention pertains to a seal which is comprised of a pair of relatively thin and slightly flexible retaining flanges extending from a first member. The retaining flanges and first member form a cavity having a truncated cone cross section. The smaller end of the cone cross section cavity is an opening away from the first member. The cavity is filled with a sealing material, such as indium or lead, which is capable of cold flow. A knife edge extends from a second member for cooperative engagement with a mating surface formed in the sealing material. The width of the base of the knife edge is substantially less than the opening into the cavity so that upon movement of the first member toward the second, the knife edge is easily moved against the mating surfaces which may then undergo cold flow to adjust thereto without severe aligning requirements for the closing mechanism. The first and second members are moved together until the second member and retaining flanges are in contact. Then a sealing force is applied. The retaining flanges are driven slightly inward, thereby forcing the sealing material against the knife edge and all surfaces defining the cavity. Since the first member is forceably engaged with the two retaining flanges, the sealing material is prevented from cold flow or creep beyond the confines of the cavity and a highly effective vacuum seal is obtained.

Accordingly, it is an object of the invention to provide an improved confined cold flow seal which maintains a high differential vacuum pressure at a very low leakage rate.

Another object of the invention is to seal a large diameter opening using a low total sealing force to attain a low leakage rate of a fluid mass at a high differential pressure.

Another object is to repeatably close a seal using substantially the same sealing force on successive closures.

Another object is to provide a high pressure metal seal in which no substantial creep is observable, even after repeated closures, and in which large tolerances are available for closure of the parts.

Other objects and advantageous features of the invention will be apparent in the following exemplary description of a specific embodiment and accompanying drawing, in which.

Figure 1:
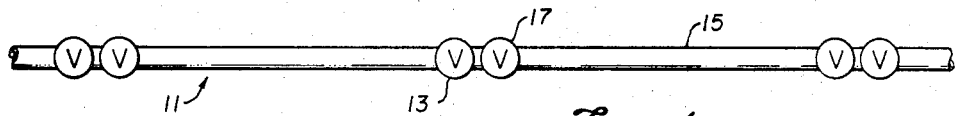
FIGURE 1 is a diagram indicating a valve arrangement according to the invention, as installed in a linear accelerator.

The invention pertains to seals generally, such as found in vacuum valves, conduit joints and the like, where it is necessary to restrain a fluid mass, either gaseous or liquid, at a high differential pressure. The invention pertains especially to seals used in radiation environments, such as an evacuated linear accelerator, in which it is necessary to use all radiation resistant metal parts such as stainless steel and indium. FIGURE 1 is a diagram of a portion of a long, high-energy linear accelerator 11, in which a valve 13 exemplifying the invention may be useful. The waveguide for the linear accelerator is manufactured in conveniently long sections 15. Upon assembly of the sections 15, the valve 13 and a fast-acting valve 17 are inserted between each of the sections. The fast-acting valve 17 is required along the length of the evacuated accelerator to avoid damage and possible rupture of the accelerator caused by shock waves that would result from a large leak into the accelerator waveguide. The fast-acting valves 17, however, are not suitable alone, due to a relatively high leakage rate, for isolating various sections 15 when it is necessary to service, replace or repair particular sections or their associated components. Slower-acting and relatively leak-tight valves 13 are therefore inserted between each section 15 to supplement the valves 17 and to ensure minimum leakage of atmosphere into the accelerator and consequent gas-absorption by the accelerator components and interference with accelerator operation. The time required for pumping to attain a high vacuum in the accelerator to again place it in operation after servicing is thereby minimized.

Figure 2:
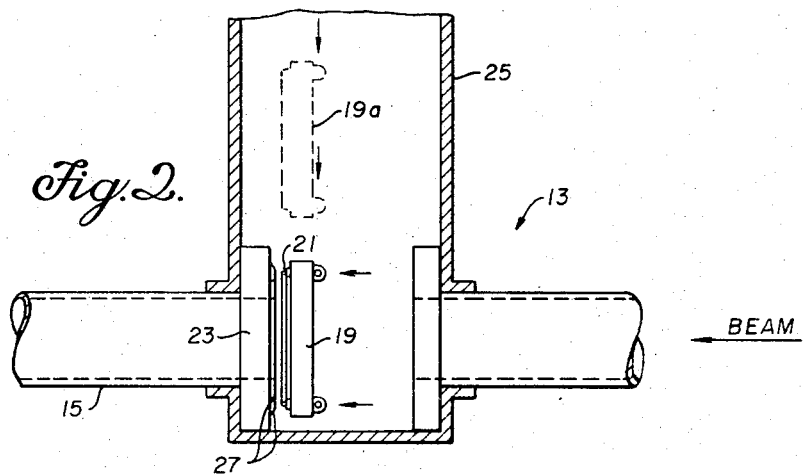
FIGURE 2 is a diagram, partially in cross section, showing pertinent parts of a valve in FIGURE 1 which utilizes a seal according to the invention.

Since a linear accelerator operates in a nuclear radiation environment, all of the materials of such a valve 13 must be made of radiation-resistant material, such as stainless steel and indium. The valve 13 is shown generally in FIGURE 2, and includes a solid metal closure plate 19 having a stepped continuous circumferential knife edge 21 extending therefrom. As the other closure member of said valve, a metal flange 23 is suitably attached to tubular accelerator section 15. The plate 19 and flange 23 are enclosed in a vacuum-tight housing 25 to thereby connect successive tubular accelerator sections 15 in a vacuum relationship to provide a path between sections for the accelerator beam. Normally, the plate 19 is maintained by a conventional manipulating mechanism (not shown) in a position 19a clear of the accelerator beam to permit its unobstructed passage therethrough. Closing mechanisms of a wide variety, either powered or hand-operated, can be used. Even a simple push rod passing through a hermetic seal could be used to move said closure. The construction and arrangement of such manipulating mechanism forms no part of the present invention, and accordingly, only general descriptive reference is made thereto. When it is desired to isolate a section 15 of the accelerator, the plate 19 is lowered by the closing mechanism to the position shown and is then driven toward the flange 23. A pair of slightly flexible metal retaining flange rim members 27 are concentrically attached to the face of the flange 23, and define a cavity with the flange 23, which is filled with a sealing material capable of cold flow. Thus, to close the valve, the plate 19 is driven by the closing mechanism toward the flange 23, forcing the knife edge 21 into the sealing material until the face of the plate 19 is against the retaining flange rims 27. At such a time, the sealing material adjusts to the knife edge and is forced against all surfaces of the cavity and the knife edge to seal and isolate adjacent sections 15.

Figure 3:
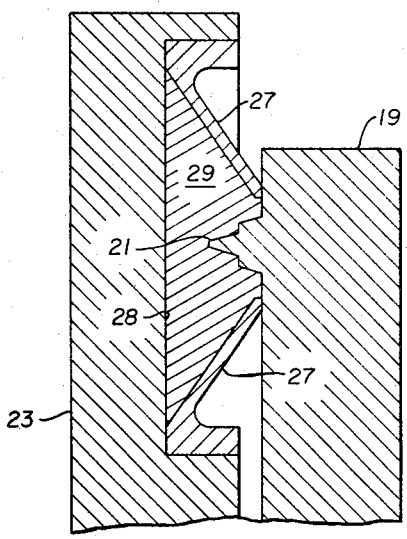
FIGURE 3 is an enlarged view of the sealing arrangement shown in FIGURE 2 when the valve is closed.

More particular features of the seal are shown in FIGURE 3, which is an enlarged detailed view in cross section of a portion of the valve 13 when it is in its fully closed position. The flange 23 is an annular plane-face pipe flange, and is provided with an annular groove 28 in said annular plane face. The retaining flange rims 27 are in the form of generally frusto-conical flexible rings, and are suitably secured within the groove, as by welding, to define, in combination with the bottom of groove 28, said cavity which is filled with a radiation-resistant sealing material 29, such as indium, which is capable of plastic or cold flow.

The outermost of said flange rim rings includes a relatively rigid outer portion fitting against the outer marginal edge of groove 28 and a relatively flexible frusto-conical portion extending radially inward in groove 28. The innermost of said flange rim rings includes a relatively rigid inner portion fitting against the inner marginal edge of said groove with a relatively flexible inverted frusto-conical portion extending outwardly in concentric matching relation to the flexible portion of said outermost rim ring. Accordingly, the cavity defined between said flange rim rings is broad at the base adjacent the base of groove 28 and narrows toward the mouth defined between the converging peripheries of said flexible rim rings.

The retaining flange rim members 27 are arranged to provide an opening between the outer edges thereof for receiving the knife edge 21 which is stepped and also ring-shaped. There is sufficient clearance between the outer edges of the retaining flanges 27 to allow entry, even though misaligned, of the knife edge 21, thereby obviating the need for a highly accurate closing mechanism to drive the knife edge into the indium. Enough sealing material 29 is provided to just fill the cavity when the knife edge 21 is inserted therein and the face of the plate 19 forced against the retaining flange rims 27. It is desirable to provide walls for the retaining flanges 27 which are thin enough to be slightly flexible toward the flange 23 when plate 19 is forced against the retaining flanges to provide for effective sealing and retention of the sealing material.

Thus upon application of a sealing force to the flange 23 and plate 19, the plate is driven against the retaining flanges 27 forcing the retaining flanges slightly inward. The sealing force is transmitted thereby to the sealing material, causing it to cold flow against all of the surfaces within the cavity, thereby tightly sealing the knife edge. Since a large part of the force applied to the plate 19 is between the face of the plate and the outer edges of the retaining flange rims, the sealing material is prevented from flowing out of the cavity, thereby providing a creep-free seal.

The flexibility of the retaining flange rims 27, plus the plastic or cold flow nature of the sealing material, causes the sealing force applied to the plate 19 to be distributed over the sealing surfaces, as well as its being utilized to prevent extrusion of the sealing material from between plate 19 and flanges 27. This arrangement enables the use of a relatively low sealing pressure, and is therefore especially suitable for large diameter seals where a high lineal sealing pressure results in an unreasonable total sealing force.

Since the sealing material is confined at all times to the cavity and is capable of cold flow, repeated closures of the valve may be made during which any misalignment is taken up by cold flow of the sealing material without its extrusion from the cavity. The cold flow of the sealing material and its total confinement to the cavity permit successive closures with the same pressure; and upon each closure, a seal is attained which has a very low leakage rate.

A model valve having a 7.45" diameter seal was constructed of stainless steel parts with indium as the sealing material according to the invention. The valve was subjected to severe testing during which an abnormally high sealing pressure was applied to the seal. The seal was then separated, rotated and reseated. Thereafter, a light sealing force was applied and the rate of leakage checked. This sort of test procedure subjects the seal, in an exaggerated manner, to conditions usually found in actual use of valves where the valve is generally subjected to a constantly decreasing sealing force which may result from wear of valve parts and/or seal creep. Leakage rates varied from $1 \times 10^{-7}$ cc. He/sec. at a pressure differential of 1 std. atmos. to less than $1 \times 10^{-9}$ cc. He/sec. at a pressure differential of 1 std. atmos. Leakage rates less than $1 \times 10^{-9}$ gave no indication on the test instruments. All of these leakage rates were obtained with sealing forces less than 400 lbs. per lineal inch of seal. After over 400 closures, no deterioration in the sealing ability of the valve was observable, and any creep of the indium seal was so small as not to be measurable with a micrometer.

While there has been described in the foregoing what may be considered to be a preferred embodiment of the invention, other embodiments such as briefly mentioned hereinbefore, and modifications, may be made therein within the scope of the invention as defined in the appended claims.

What is claimed is:

1. In a system for maintaining a low leakage seal, the combination of:
   (a) a first member having a pair of retaining flange rims extending therefrom, said flanges extending at such an angle as to define with said member a cavity having an enlarged space adjacent said member and an opening smaller than said enlarged space away from said member;
   (b) deformable sealing material confined in the cavity by said flanges;
   (c) a second member having a sealing edge extending therefrom which fits through said opening into sealing engagement with said sealing material upon movement of said second member against said pair of retaining flanges, said retaining flanges being slightly flexible so that upon application of a sealing force to said first and second members, said retaining flanges flex to transmit the sealing force to said sealing material to cause cold flow of said sealing material against said sealing edge and all surfaces defining the cavity.

2. In a system for maintaining a low leakage seal according to claim 1, wherein the opening between said retaining flanges is substantially wider than said sealing edge to accommodate misalignment between said retaining flanges and sealing edge during successive closures.

3. In a system for maintaining a low leakage seal according to claim 1, wherein said retaining flanges have relatively thin and flexible walls responsive to application of a sealing force to said first and second members to transmit a force to said sealing material causing it to flow against said sealing edge and all surfaces defining the cavity.

4. In a system for maintaining a low leakage seal according to claim 1, wherein said first member, said retaining flanges, said second member, and said sealing edge are of radiation-resistant metal and said sealing material is indium to form a low leakage seal that resists deterioration in a highly radioactive environment.

5. In a system for maintaining a low leakage seal according to claim 1, wherein said first member is a circular pipe flange having a circular groove in its face, said retaining flanges are circular rings welded in the groove, said second member is a solid plate, and said sealing edge is a stepped knife edge ring, said seal being operable as a valve for sealing a section of piping against a high differential pressure.

6. In a system for maintaining a low leakage seal according to claim 1, wherein said second member has a substantially flat face from which said sealing edge extends, said retaining flanges have outer edges lying in a plane substantially parallel to the face of said first member for mating engagement therewith to confine said sealing material to said groove upon application of a sealing force to said second member.

References Cited

UNITED STATES PATENTS

| | | | |
|---|---|---|---|
| 1,963,518 | 6/1934 | Bradley | 251—157 X |
| 2,992,654 | 7/1961 | Doremus et al. | 251—317 X |
| 3,130,952 | 4/1964 | Meyer | 251—317 X |

LEONARD D. CHRISTIAN, *Primary Examiner.*

U.S. Cl. X.R.

251—314, 317, 332.